F. TIEMANN.
VACUUM PAN.
APPLICATION FILED MAR. 14, 1908.
955,483.
Patented Apr. 19, 1910.
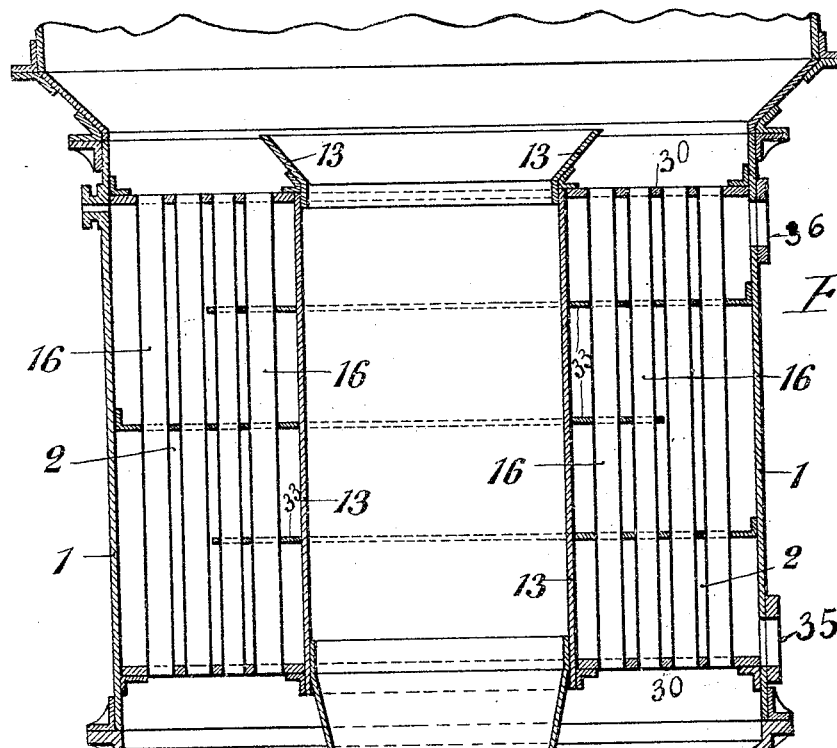
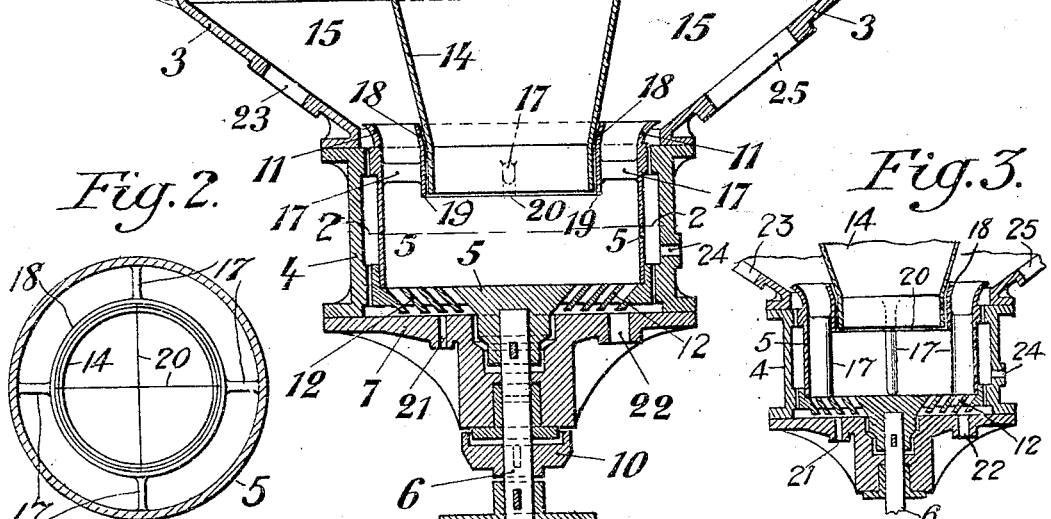

UNITED STATES PATENT OFFICE.

FRITZ TIEMANN, OF TUCUMAN, ARGENTINA.

VACUUM-PAN.

955,483.  Specification of Letters Patent.  Patented Apr. 19, 1910.

Application filed March 14, 1908. Serial No. 421,221.

*To all whom it may concern:*

Be it known that I, FRITZ TIEMANN, director, a subject of the German Emperor, residing at Tucuman, Argentina, South America, have invented certain new and useful Improvements in Vacuum-Pans; and I do hereby declare the following to be a full, clear, and exact description of the invention, such as will enable others skilled in the art to which it appertains to make and use the same.

The invention relates to concentrating apparatus for fluids, especially masse-cuite or sugar mass and has for its object to provide such an apparatus with means for effecting a uniform circulation of the mass during the cooking operation.

To this end, the invention involves the use of a centrifugal drum mounted in the cooker or boiling apparatus below the heating apparatus and preferably provided with a perforate bottom and imperforate upwardly directed side walls, whereby as the drum rotates the liquid contained therein rises along the walls in a parabolic path, and is then forced upward from the drum and through the tubes of the superimposed heating apparatus by the liquid which is supplied to the apparatus or by the liquid which has passed through the heater tubes and is delivered again into the drum. There thus results a continuous uniform circulation of the liquid filling mass in the apparatus from the drum upward through the heater and back to the drum.

The invention is illustrated in the accompanying drawings in which:

Figure 1 is a sectional elevation of the machine, Fig. 2 is a horizontal section on line 2—2 of Fig. 1, Fig. 3 is a horizontal section of the lower portion of the machine showing a slightly modified form.

Referring to the drawings, 1, indicates the outer wall or casing of the heating apparatus or cooker comprising a steam space 2, formed between tube sheets 30—30, intersected by tubes 16 which tubes afford passage ways for the fluid from the lower to the upper part of the apparatus. Within the space 2 are disposed a number of baffle plates 33 so disposed as to cause the steam to follow a tortuous path between the inlet 35 and the outlet 36. Below the portion 1 of the casing there is provided a conical portion 3 and below the latter is a cylindrical chamber 4 in which is located centrifugal drum 5, the spindle 6 of which passes through the bottom 7 of chamber 4 and is mounted in a suitable step-bearing 8. Upon the outer end of spindle 6 is secured a drive pulley 9, and between the latter and the spindle bearing in the bottom 7 is collar 10 keyed to the spindle serving to prevent the drum 5 rising in the chamber 4 when the cooking apparatus is under vacuum. Preferably the upper rim or edge of the drum 5 is flared outwardly somewhat. The bottom of the rotating drum 5 may be solid and imperforate or perforate, plain, or provided with slats or blades. When the apparatus is designed to take in fresh solution or liquid at the bottom the annular louver-like arrangement indicated at 12 is preferable. The incoming mass of liquid passes through the openings between the blades 12 into the drum 5 where it becomes thoroughly mixed with the filling mass therein contained.

Passing downwardly through the heating section 2 of the machine and centrally disposed within the same is a hopper or funnel-like conduit 13, the lower tapering end of which lies centrally within the upper portion of the centrifugal drum 5. The said drum 5 is provided near its upper end with a series of inwardly projecting ribs 17 which support a centrally disposed collar 18, which surrounds the lower portion of the generally conical end 14 of the conduit 13. The ring 18 supported by the ribs 17, rotates with the drum 5, and its purpose and effect is to neutralize the dead space about the lower end of the conduit 13. It is further advisable in order to considerably increase the efficiency of the device, that the lower edge of ring 18 be provided with diametrically disposed knife edges or cross wires 20, which, participating in the rotation of the drum and ring, continually cut the fluid mass passing from the lower end or conduit 13 into the drum 5, thereby prevents the entering liquid from participating in the rotary movement of the drum until the liquid passes from below the end of said conduit 13. It may be further advisable, more particularly in cases where highly viscous masses are treated in the apparatus, to extend the ribs 17 downward in the drum 5, as indicated in Fig. 3, thereby providing inwardly projecting fins or blades on the interior walls of the drum, which impart a positive rotary motion to the liquid mass after the latter has passed from below the lower end of conduit 13. The supply of fresh liquid or filling mass may be continuously effected through openings 21 and 22 in the bottom of the lower chamber 4 so as to fill the dead spaces under the drum 5, and also to continuously displace any of the filling mass which might tend to lodge there. The latter effect may also be accomplished by admitting steam by way of inlet 24 adjacent the side of drum 5. The principal inlet 23 for the supply of the liquid to the cooking apparatus is, however, preferably located in the conical wall 3 of the apparatus above the drum chamber and the discharge for the cooked mass is likewise in this conical wall as indicated at 25. It will be apparent that upon opening the discharge 25, all of the liquid in the upper part of the apparatus will flow out and the portion of the liquid which lies below said opening 25 may be forced out by the rotation of the drum 5, or the admission of fresh mother liquor by way of inlets 21 and 22 below the drum.

By means of the apparatus hereinbefore described it is possible to effect a thorough and uniform circulation of the mass upward through the heating system and thence downward again into the drum, so that the crystal forming masses contained in the mother liquor travel at uniform speed over the surfaces of the heating apparatus where evaporation takes place, thereby materially increasing the tendency to produce large well formed crystals and admitting of the boiling or cooking of the mass being effected at a relatively low temperature, which is now recognized, particularly in the sugar art, as being of great advantage.

What I claim is:—

1. In a concentrating apparatus for liquids, the combination of a heating chamber, and a rotary drum having upwardly directed side walls mounted therein to receive the liquid and cause a circulation of the same in the heating chamber.

2. In a concentrating apparatus for liquids, the combination of a heating chamber, and a rotary drum having upwardly directed side walls mounted in the lower portion of said chamber to receive the liquid and cause a circulation of the fluid in the heating chamber.

3. In a concentrating apparatus for liquids, the combination of a heating chamber, a rotary drum having upwardly directed side walls mounted in the lower portion of said chamber, and a conduit located in said chamber having an intake opening in communication with the upper portion of said chamber and its discharge opening into said drum, whereby the liquid is caused to circulate from the drum upward through the heating chamber and downward through said conduit back into the drum.

4. In a concentrating apparatus for liquids, the combination of a heating chamber, a rotary drum mounted in the lower portion of said chamber, a conduit located in said chamber having an intake opening in communication with the upper portion of said chamber and its discharge opening into said drum, and a collar connected to said drum surrounding the discharge end of said conduit.

5. In a concentrating apparatus for liquids, the combination of a heating chamber, a rotary drum mounted in the lower portion of said chamber, a conduit located in said chamber having an intake opening in communication with the upper portion of said chamber and its discharge opening into said drum, a collar connected to said drum surrounding the discharge end of said conduit, and wires stretched across said collar below the discharge of said conduit.

6. In a concentrating apparatus for liquids, the combination of a heating chamber, a rotary drum having a foraminated bottom and upwardly extending sides mounted in the lower portion of said chamber and a stationary conduit connecting the interior of said drum with the upper portion of said heating chamber.

7. In a concentrating apparatus for liquids, the combination of a heating chamber, a rotary drum having upwardly directed side walls mounted in the lower portion of said chamber and means for preventing upward movement of said drum in said chamber.

In testimony whereof I have affixed my signature, in presence of two witnesses.

FRITZ TIEMANN.

Witnesses:
WOLDEMAR HAUPT,
HENRY HASPER.